United States Patent [19]

Hawkins

[11] 4,303,873
[45] Dec. 1, 1981

[54] RESET WINDUP LIMITING

[75] Inventor: Royal R. Hawkins, Bloomington, Minn.

[73] Assignee: Honeywell Inc., Minneapolis, Minn.

[21] Appl. No.: 163,744

[22] Filed: Jun. 27, 1980

[51] Int. Cl.³ .............................................. H02P 5/16
[52] U.S. Cl. .................................... 318/301; 318/327; 318/434; 318/610
[58] Field of Search ............... 318/609, 610, 611, 618, 318/636, 626, 627, 434, 326, 327, 328, 628, 301

[56] References Cited

U.S. PATENT DOCUMENTS

| | | | |
|---|---|---|---|
| 3,252,069 | 5/1966 | Ringrose | 318/308 |
| 3,317,806 | 5/1967 | Frrinelli et al. | 318/398 |
| 3,416,058 | 12/1968 | Hill et al. | 318/310 |
| 3,450,973 | 6/1969 | Toby | 318/307 |
| 3,566,241 | 2/1971 | Ross | 318/610 |
| 3,576,485 | 4/1971 | Coons, Jr. | 318/434 |
| 3,649,897 | 3/1972 | Messick | 318/434 |
| 3,656,043 | 4/1972 | Kawada et al. | 318/610 |
| 3,819,999 | 6/1974 | Platt | 318/610 |
| 3,909,734 | 9/1975 | Palombo | 328/181 |
| 3,931,557 | 1/1976 | Osburn | 318/434 |
| 3,944,901 | 3/1976 | Janssen et al. | 318/318 |
| 3,955,130 | 5/1976 | Graf | 318/332 |
| 4,011,491 | 3/1977 | Grover et al. | 318/327 |
| 4,035,703 | 7/1977 | Habutzel | 318/345 B |
| 4,070,609 | 1/1978 | Barrett et al. | 318/610 |
| 4,121,141 | 10/1978 | Frazee | 318/326 |

*Primary Examiner*—David Smith, Jr.
*Attorney, Agent, or Firm*—Trevor B. Joike

[57] ABSTRACT

A proportional control system for controlling a condition at a setpoint is disclosed wherein the system has reset for substantially reducing system droop and incorporates reset windup limiting, the system having a setpoint apparatus for establishing the setpoint for the system, a feedback circuit for supplying a feedback signal in accordance with the condition, a reset circuit connected to both the setpoint apparatus and the feedback circuit for substantially reducing system droop, the reset circuit for supplying a reset output signal, and the reset circuit having a reset windup limiting circuit for limiting reset windup of the reset circuit.

16 Claims, 1 Drawing Figure

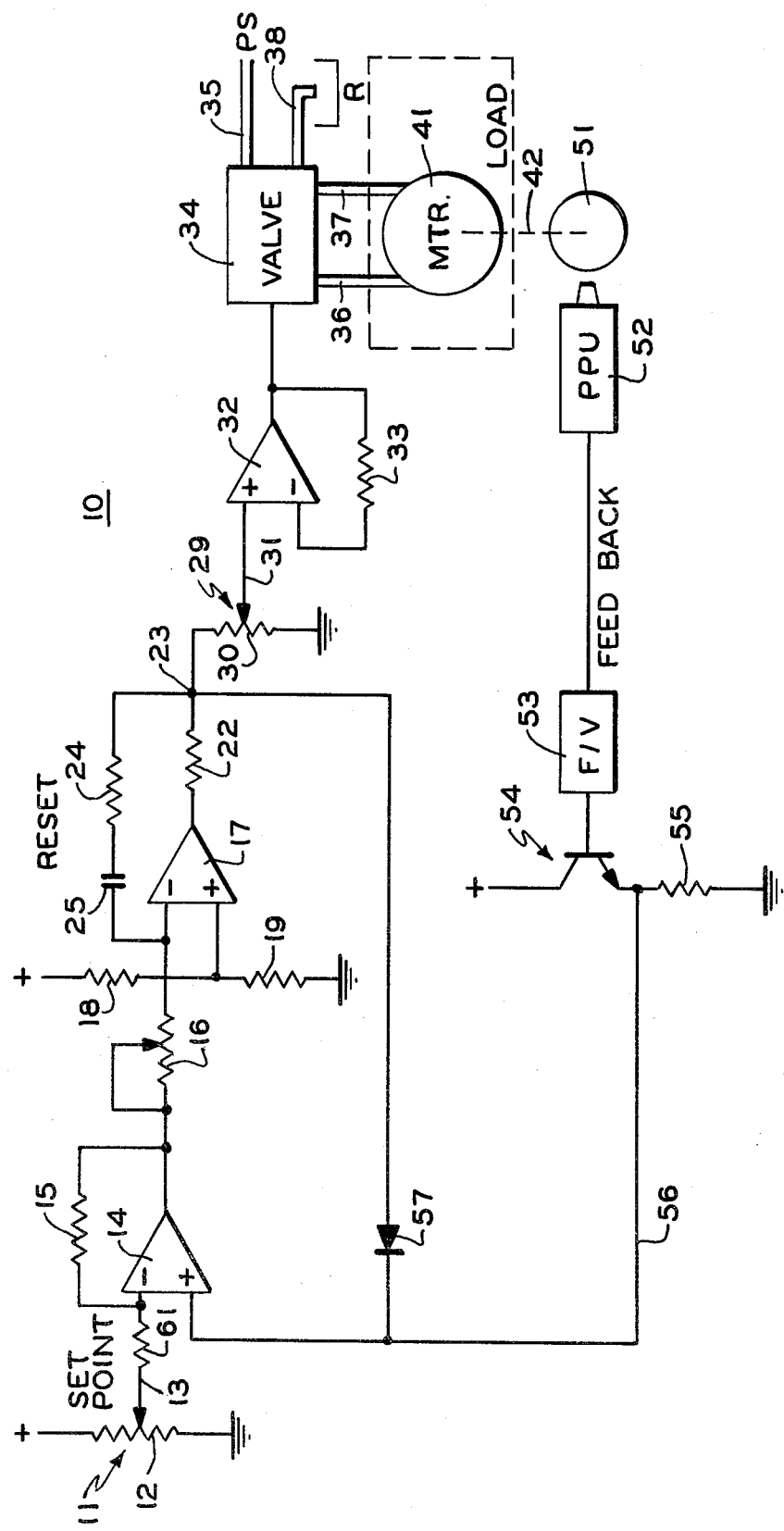

RESET WINDUP LIMITING

BACKGROUND OF THE INVENTION

The present invention relates to a proportional control system having reset for substantially reducing system droop and, more particularly, to a system wherein any reset windup which the system experiences is limited to a nominal value.

Original condition control systems for controlling such conditions as temperature, humidity, motor position and motor speed were primarily manually controlled systems which required an operator to be in continuous attendance to supervise the condition being controlled and make any necessary adjustments for ensuring that the condition was being controlled at the proper level. Because such systems required a human operator to continually monitor and adjust the control system, the number of control systems which could be supervised by a single human operator had to be kept within reasonable bounds. Moreover, any momentary inattention of the human operator could result in processes being ruined, motors being driven to the wrong position resulting in irregularities of the work pieces being processed by the motor control systems, and the like. In order to avoid such problems caused by inadvertence or mistake of the human operator and to relieve the human operator of many of the supervisory and control duties attendant with such control systems, the prior art developed automatic control systems.

Such automatic control systems typically involved a manual setpoint control, which the human operator could adjust once or periodically according to a program sequence and a condition sensing mechanism for providing a feedback signal based upon the actual condition being sensed. The system compared the desired or set point level for the condition against the actual level of the condition to reduce any deviations therebetween by proper adjustment of the control system. Thus, such systems did not require constant supervision by the human operator.

Such control systems were typically proportional control systems which controlled such loads as motors and heaters in proportion to the error signal between the desired or set point level for the condition and the actual level of the condition. But the proportional control system requires an error signal between the set point level and the actual level of the condition in order to control the load for maintaining the condition at the desired level. For example, if the load is an electric heater in a process control oven, a drop in the temperature outside of the oven will mean that more current must be supplied to the heater in order to maintain the temperature within the oven at the desired level. More current can only be supplied to the heater if there is an increased error signal between the sensed condition and the desired condition. If the temperature outside of the oven drops still further, the error signal must increase in order to supply still more current to the electric heater. Thus, it can be seen that how hard the load must work to maintain the desired condition determines the amount of error signal. In order for there to be an error signal, there must be a deviation between the actual condition and the set point condition. This error signal is called "droop."

As can be seen, droop is undesired because it results from the necessary requirement that in order to energize the load at a given level to meet external conditions, there must be a deviation between the actual condition and the desired condition. Such a deviation means that the actual condition cannot equal the set point condition. In order to eliminate this droop, prior art systems incorporated reset into proportional control systems. Reset requires that, as soon as an error signal develops, there is a gradual shift of the proportional band to bring the controlled condition back to the desired level. Thus, the error signal is gradually reduced until it is substantially eliminated and the actual condition is at set point.

Unfortunately, if the load is incapable of controlling the load at a level which is required by the control system, the reset portion of the control system will continuously adjust the proportional band to a limit which is defined by the system parameters. This phenomenon is known as "reset windup." If the condition which has caused the reset windup is suddenly corrected after the limit is reached, the load then is suddenly energized fully in one direction or another which can cause as a minimum a sharp and substantial deviation in the condition being controlled by the load and, possibly, damage to the load being controlled by the proportional control system. The present invention provides a mechanism for limiting reset windup.

SUMMARY OF THE INVENTION

A proportional control system for controlling a condition at a setpoint is disclosed wherein the system has reset for substantially reducing system droop and has reset windup limiting. The system includes a setpoint apparatus for establishing a setpoint for the proportional control system, a feedback circuit for sensing the condition, the condition being controlled by a load, a reset circuit which is connected to both the setpoint apparatus and the feedback circuit for substantially reducing system droop, and a reset windup limiting circuit for limiting reset windup of the reset circuit.

BRIEF DESCRIPTION OF THE DRAWING

These and other features and advantages will become more apparent from a detailed consideration of the invention when taken in conjunction with the single FIGURE of the drawing which shows a control system incorporating the present invention.

DETAILED DESCRIPTION

In the example shown in the drawing, the condition being controlled by control system 10 is motor speed. Control system 10 comprises a setpoint apparatus in the form of potentiometer 11 having a resistance element 12 connected between a source of positive potential and ground and a wiper arm 13 connected to one input of the reset and control circuit the other input of which receives the feedback signal over feedback line 56.

Specifically, wiper arm 13 is connected through resistor 61 to the negative input of amplifier 14 the output from which is connected back to its negative input through feedback resistor 15. The output of amplifier 14 is also connected through reset gain potentiometer 16, connected in rheostat fashion, to the negative input of amplifier 17. The positive input terminal of amplifier 17 is connected to a voltage divider comprising resistors 18 and 19 connected between a positive voltage source and return. The output of amplifier 17 is connected through resistor 22 to junction 23. Junction 23 is connected through series connected feedback resistor 24 and capacitor 25 to the negative input of amplifier 17. The series circuit of resistor 24 and capacitor 25 provides the integration function for integrating amplifier 17. Junction 23 is also connected through potentiometer 29 which has a resistive element 30 one side of which is connected to junction 23 and the other side of which is connected to return. Potentiometer 29 also has a wiper arm 31 connected to the positive input terminal of amplifier 32 the output from which is connected to its negative input through resistor 33. Potentiometer 29 is used to calibrate the system and resistor 24 is used to establish the proportional gain of the proportional control system 10.

Valve 34, which may take the form of a V7058 servovalve manufactured by Honeywell Inc., is used to connect the abovedescribed reset and control circuit to the load in the form of motor 41. Valve 34 operates in response to the output from amplifier 32 for controlling the flow of fluid from an inlet supply line 35 to outlet lines 36 and 37 and return line 38. Lines 36 and 37 are used to operate motor 41 which has an output shaft 42 for driving an implement.

To ensure that motor 41 is operating at the speed established by setpoint potentiometer 11, disc 51 is also connected to shaft 42 and turns at a speed commensurate with the rotational speed of shaft 42. Disc 51 operates in conjunction with pulse pickup unit 52 which may, for example, be in the form of a magnetic pickup which supplies a pulse for each magnet mounted to the periphery of wheel 51. On the other hand, disc 51 and pulse pickup unit 52 may take different forms such as an optical unit which responds to light and dark areas on the periphery of wheel 51. Pulse pickup unit 52 supplies a series of pulses the frequency of which is dependent upon by the speed of shaft 42 and disc 51. These pulses are then fed to a frequency-to-voltage converter 53 which converts the frequency into a DC voltage the level of which is determined by the frequency of the pulses received at its input and, therefore, the speed of shaft 42. The voltage output from frequency-to-voltage converter 53 is connected to the base of transistor 54 which has its collector connected to a positive source and its emitter connected to ground through resistor 55. The emitter of transistor 54 is then connected to the positive input terminal of amplifier 14.

To prevent reset windup of the reset circuit, diode 57 is connected in the forward direction from junction 23 to feedback line 56. Thus, diode 57 clamps the voltage at junction 23 to one diode voltage level above the feedback voltage on line 56.

When the position of wiper arm 13 with respect to potentiometer 12 is changed in order to change the speed of motor 41, or when the load on motor and shaft 42 changes, an error signal is produced between the inputs to amplifier 14. Amplifier 14 compares the voltage on wiper arm 13 with the feedback voltage on line 56 to provide an output signal to the input of amplifier 17. Amplifier 17 in conjunction with capacitor 25 and resistor 24 begins integrating this error signal such that the voltage at junction 23 gradually changes in a direction to alter the position of valve 34 for changing the flow of hydraulic fluid in lines 36 and 37 to motor 41 in such a direction that the speed of output shaft 42 will be altered in the direction dictated by the change in the direction of the error voltage. As the speed of shaft 42 changes, the speed of disc 51 also changes which changes the frequency of the pulses supplies by pulse pickup unit 52. The level of output voltage from frequency-to-voltage converter 53 correspondingly changes and the voltage on line 56 changes in a direction to balance the original change across the inputs of amplifier 14.

Because shaft 42 is being loaded down, an error signal must exist across the inputs to amplifier 14 for ensuring that motor 41 is driven at a speed to make up for the loading on shaft 42. This difference across the inputs to amplifier 14 results in droop were it not for the reset action. However, capacitor 25 will charge and continue to charge as long as an error signal exists between the inputs to amplifier 14. As long as capacitor 25 charges, the voltage at junction 23 will continue to change thus adjusting the speed 42 until the error signal has been substantially reduced.

If for some reason the motor were to stall such that shaft 42 no longer turns, the error signal to the inputs of amplifier 14 becomes very large and capacitor 25 will continue to charge trying to correct for the error. Because shaft 42 is not turning, capacitor 25 will charge until amplifier 17 saturates. The voltage at junction 23 at this point will be at its maximum value. At this point, if the stalling condition is suddenly removed from motor 41, the flow rate to motor 41 through hydraulic lines 36 and 37 will increase dramatically which could cause damage to motor 41 and its associated equipment and will cause erratic control of the proportional control system.

However, diode 57 ensures that the output at junction 23 from amplifier 17 can never become greater than a one diode voltage drop above the feedback voltage on line 56. Thus, if motor 41 should stall and the speed of shaft 42 decrease to substantially nothing, the voltage on line 56 will become substantially zero and the voltage at junction 23 will be a one diode voltage drop above zero. Thus, when the condition which has caused the stalling of motor 41 is corrected, a large error signal will be produced by amplifier 14 but capacitor 25 will slowly charge thus resulting in a gradual change of the voltage at 23 and a gradual change of the flow of hydraulic fluid to motor 41 to eliminate any sudden surge of hydraulic flow to motor 41.

The embodiments of the invention in which an exclusive property or right is claimed are defined as follows:

1. A proportional control system for controlling a condition at a setpoint, said system having reset for substantially reducing system droop and having reset windup limiting comprising:
   setpoint means for establishing said setpoint for said proportional control system;
   feedback means for supplying a feedback signal in accordance with said condition, said condition being controlled by a load;
   reset means being connected to both said setpoint means and said feedback means for substantially reducing said system droop, said reset means having an output for supplying a reset output signal,
   reset windup limiting means connected to said output of said reset means and to said feedback means so that said reset output signal is limited to a value that differs from said setpoint by a predetermined increment; and
   means connected to said reset means and adapted to be connected to said load for controlling said load in accordance with said reset output signal.

2. The system of claim 1 wherein said reset output signal limiting means comprises a diode connected between said feedback means and said reset means.

3. The system of claim 2 wherein said reset means comprises a comparator amplifier having a comparator output, a first input connected to said setpoint means and a second input connected to said feedback means.

4. The system of claim 3 wherein said reset means comprises integrating amplifier means having an input connected to the output of said comparator amplifier and having said reset output for supplying said reset output signal.

5. The system of claim 4 wherein said diode is connected from said reset output to said feedback means.

6. The system of claim 5 wherein said feedback means comprises a condition sensor for sensing said condition and a transistor having an input connected to said condition sensor and an output connected to said second input of said comparator amplifier.

7. The system of claim 6 wherein said diode is connected between said reset output of said integrating amplifier and said output of said transistor.

8. The system of claim 1 wherein said reset windup limiting means comprises a diode connected between said feedback means and said reset output for limiting said reset output signal to a one diode voltage drop above said set point.

9. A proportional motor speed control system for controlling the speed of a motor at a setpoint, said system having reset for substantially reducing system droop and having reset windup limiting comprising:

setpoint means for establishing said setpoint for said proportional motor speed control system;

feedback means for supplying a feedback signal in accordance with the speed of said motor;

reset means being connected to both said setpoint means and said feedback means for substantially reducing said system droop, said reset means having a reset output for supplying a reset output signal, reset windup limiting means connected to said output of said reset means and to said feedback means so that said reset output signal is limited to a value that differs from said setpoint by a predetermined increment; and means connected to said reset means and adapted to be connected to said motor, said speed of said motor being controlled in accordance with said reset output signal.

10. The system of claim 9 wherein said reset output signal limiting means comprises a diode connected between said feedback means and said reset means.

11. The system of claim 10 wherein said reset means comprises a comparator amplifier having a comparator output, a first input connected to said setpoint means and a second input connected to said feedback means.

12. The system of claim 11 wherein said reset means comprises integrating amplifier means having an input connected to the output of said comparator amplifier and having said reset output for supplying said reset output signal.

13. The system of claim 12 wherein said diode is connected from said reset output to said feedback means.

14. The system of claim 13 wherein said feedback means comprises a condition sensor for sensing said speed of said motor and a transistor having an input connected to said condition sensor and an output connected to said second input of said comparator amplifier.

15. The system of claim 14 wherein said diode is connected between said reset output of said integrating amplifier and said output of said transistor.

16. The system of claim 9 wherein said reset windup limiting means comprises a diode connected between said feedback means and said reset output for limiting said reset output signal to a one diode voltage drop above said set point.

* * * * *